United States Patent
Sakaguchi

(10) Patent No.: US 12,442,877 B2
(45) Date of Patent: Oct. 14, 2025

(54) MAGNETIC RESONANCE IMAGING APPARATUS, IMAGE CORRECTION METHOD, AND STATIC MAGNETIC FIELD INHOMOGENEITY CORRECTION METHOD

(71) Applicant: FUJIFILM Healthcare Corporation, Chiba (JP)

(72) Inventor: Naoya Sakaguchi, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/645,763

(22) Filed: Dec. 23, 2021

(65) Prior Publication Data

US 2022/0268865 A1    Aug. 25, 2022

(30) Foreign Application Priority Data

Feb. 25, 2021   (JP) ................ 2021-028972

(51) Int. Cl.
*G01R 33/3875* (2006.01)
*G01R 33/54* (2006.01)
*G01R 33/565* (2006.01)

(52) U.S. Cl.
CPC ....... *G01R 33/3875* (2013.01); *G01R 33/543* (2013.01); *G01R 33/56563* (2013.01); *G01R 33/56572* (2013.01)

(58) Field of Classification Search
CPC .............. G01R 33/3875; G01R 33/543; G01R 33/56572; G01R 33/56581;

(Continued)

(56) References Cited

U.S. PATENT DOCUMENTS 5,184,075 A * 2/1993 Nishimura ............. G01R 33/24
                                                                 324/309
2008/0088307 A1* 4/2008 Dewdney ........... G01R 33/3875
                                                                 324/309

(Continued)

FOREIGN PATENT DOCUMENTS

CN       1571647 A    1/2005
CN       1732847 A    2/2006

(Continued)

OTHER PUBLICATIONS

English translation of JP2017086736A provided by Espacenet. (Year: 2023).*

(Continued)

*Primary Examiner* — Rishi R Patel
(74) *Attorney, Agent, or Firm* — Paul Teng

(57) ABSTRACT

An MRI apparatus capable of correcting a static magnetic field inhomogeneity caused by application of a gradient magnetic field by a simple calculation, and a correction method of the MRI apparatus are provided. An image quality deterioration due to the static magnetic field inhomogeneity caused by application of a gradient magnetic field is estimated by a simple calculation using a shape of a pulse sequence for imaging. An amount of distortion to be generated in the image acquired by executing the pulse sequence is estimated based on the estimated static magnetic field inhomogeneity and the shape of the pulse sequence, and a distortion of a reconstructed image is corrected. Alternatively, an output of a compensation magnetic field canceling the estimated static magnetic field inhomogeneity is calculated, and is superimposed on a compensation current with an active shimming so as to be supplied to a shim coil.

13 Claims, 14 Drawing Sheets

(58) Field of Classification Search
CPC ............ G01R 33/56563; G01R 33/565; G01R 33/58; G01R 33/5608; A61B 5/055; A61B 5/72
See application file for complete search history.

(56) References Cited

U.S. PATENT DOCUMENTS

| | | | | |
|---|---|---|---|---|
| 2013/0082702 A1* | 4/2013 | Blumhagen | ...... | G01R 33/56563 324/309 |
| 2014/0225610 A1* | 8/2014 | Popescu | ......... | G01R 33/56563 324/309 |
| 2014/0347049 A1* | 11/2014 | Tsai | ................... | G01R 35/005 324/318 |
| 2019/0346521 A1* | 11/2019 | Nitta | ................... | G01R 33/543 |

FOREIGN PATENT DOCUMENTS

| | | |
|---|---|---|
| CN | 110353681 A | 10/2019 |
| JP | H10-290794 A | 11/1998 |
| JP | 2007-117765 | 5/2007 |
| JP | 2007-159718 A | 6/2007 |
| JP | 2017-000373 A | 1/2017 |
| JP | 2017-86736 | 5/2017 |

OTHER PUBLICATIONS

"Gradient Echo (GRE) What is a gradient echo, and how does it differ from an FID?" by Questions and Answers in MRI. <https://mriquestions.com/gradient-echo.html>. 2024 (Year: 2024).*

Japanese official action dated Dec. 5, 2023 (and English translation thereof) in connection with Japanese Patent Application No. 2021-028972.

Japanese official action dated Apr. 16, 2024 (and English translation thereof) in connection with Japanese Patent Application No. 2021-028972.

May 22, 2025 Chinese official action (and English-language translation thereof) in connection with Chinese patent application No. 2021114950442.

* cited by examiner

ORIGINAL IMAGE

DISTORTION
ESTIMATION IMAGE

MEASURED IMAGE

CORRECTED IMAGE

MAGNETIC RESONANCE IMAGING APPARATUS, IMAGE CORRECTION METHOD, AND STATIC MAGNETIC FIELD INHOMOGENEITY CORRECTION METHOD

BACKGROUND OF THE INVENTION

1. Field of the Invention

The present invention relates to a magnetic resonance imaging apparatus (hereinafter, referred to as MRI apparatus), and in particular, relates to a technique for reducing image quality deterioration due to a static magnetic field inhomogeneity.

2. Description of the Related Art

An MRI apparatus applies a high frequency magnetic field to a subject placed in a homogeneous static magnetic field to cause a nuclear magnetic resonance phenomenon in nuclei (protons) that is present in an optional region of the subject, and obtains a tomographic image of the region based on a nuclear magnetic resonance signal (or an echo signal) generated by the phenomenon. In addition, a gradient magnetic field is applied together with the high frequency magnetic field in order to selectively excite a specific region, and an applied magnetic field and a strength of the gradient magnetic field are controlled in order to provide positional information in a space to an echo signal to be measured.

When the gradient magnetic field is applied by the MRI apparatus, a static magnetic field inhomogeneity due to Maxwell terms such as $Z^2$, XY, ZY, and XZ occurs depending on an application axis and an application strength of the gradient magnetic field, and causes an image quality deterioration. Therefore, various methods for correcting the static magnetic field inhomogeneity due to Maxwell terms have been studied. For example, the technique described in JP-A-2017-86736 (Patent Literature 1) provides a method for correcting a static magnetic field inhomogeneity that occurs when the gradient magnetic field is applied. In this method, a time average value of a gradient magnetic field in a predetermined time unit is calculated based on a pulse sequence, and an output amount of a shim coil that adjusts the static magnetic field inhomogeneity is controlled based on the calculated time average value, so that the static magnetic field inhomogeneity is corrected with a low-capacity power supply. Further, JP-A-2007-117765 (Patent Literature 2) provides a method for measuring in advance an error magnetic field generated in a phase direction during an echo planar imaging (hereinafter referred to as EPI) sequence execution and correcting an image based on the error magnetic field.

According to the technique in Patent Literature 1, it is necessary to switch a compensation current (a shim current) that flows through the shim coil. Therefore, this technique may not be applicable to a case that a response of the shim coil is slow, because an output of a correction magnetic field may not be capable of being controlled in real time. Other problems such as generation of eddy current due to switching the shim current in a relatively short period of time may occur. On the other hand, according to the technique in Patent Literature 2, since the error magnetic field (the static magnetic field inhomogeneity) is measured by a preliminary measurement, it may be necessary to match an imaging condition and a pulse sequence that are used for actual imaging with those in the preliminary measurement, the imaging condition and the pulse sequence may need to be limited.

SUMMARY OF THE INVENTION

An object of the invention is to provide an MRI apparatus that is capable of easily correcting a static magnetic field inhomogeneity caused by application of a gradient magnetic field without executing a preliminary measurement, controlling an output of a shim coil in response to a gradient magnetic field control signal, or the like.

In order to solve the above-described problem, the MRI apparatus according to the invention estimates an influence of the static magnetic field inhomogeneity caused by application of a gradient magnetic field on an image by a simple calculation based on a shape of a pulse sequence used for imaging. An image acquired by imaging is corrected using a result of this estimation. Alternatively, according to the result of the estimation, the shim coil is energized with a compensation current in advance, and the static magnetic field inhomogeneity caused by application of the gradient magnetic field during imaging is reduced.

That is, the MRI apparatus according to the invention includes: a transmitting unit configured to irradiate a subject placed in a static magnetic field space with high frequency pulses; a receiving unit configured to receive a nuclear magnetic resonance signal generated from the subject by irradiation with the high frequency pulses; a gradient magnetic field generating unit configured to generate a gradient magnetic field in the static magnetic field space; a control unit configured to control the transmitting unit, the gradient magnetic field generating unit, and the receiving unit according to a predetermined pulse sequence; an image generating unit configured to reconstruct an image of the subject based on the nuclear magnetic resonance signal; and a calculating unit configured to estimate a static magnetic field inhomogeneity caused by application of the gradient magnetic field based on a predetermined pulse sequence. The calculating unit simply estimates the static magnetic field inhomogeneity using an application strength or an average application strength of a gradient magnetic field pulse determined by the predetermined pulse sequence.

According to one aspect of the invention, the calculating unit calculates a distortion generated in an image from the estimated static magnetic field inhomogeneity, and the image generating unit corrects a reconstructed image based on the distortion calculated by the calculating unit.

According to another aspect of the invention, the calculating unit calculates a compensation current that generates a correction magnetic field based on the estimated static magnetic field inhomogeneity, and the control unit executes a control to apply the calculated compensation current in advance.

According to the invention, it is possible to correct image quality deterioration due to a static magnetic field inhomogeneity caused by application of a gradient magnetic field without controlling an output of a correction magnetic field in real time. At the same time, it is possible to eliminate a secondarily generated error magnetic field caused by changing the output of the correction magnetic field in real time. Accordingly, in particular, a remarkable effect can be achieved in a medium-low magnetic field MRI apparatus in which the influence of the static magnetic field inhomogeneity caused by application of the gradient magnetic field is large, or an apparatus in which a response of the shim coil is slow. Further, since the static magnetic field inhomogeneity is estimated based on a pulse sequence that is actually used for imaging, not for a preliminary measurement, it is not necessary to limit an imaging condition or a pulse sequence, and flexibility of imaging rises.

BRIEF DESCRIPTION OF THE DRAWINGS

FIGS. 9A and 9B are diagrams showing the image distortion due to the static magnetic field inhomogeneity Bc, in which FIG. 9A is an original image without distortion, and FIG. 9B is an image distorted due to Bc;

FIGS. 10A and 10B are diagrams showing a correction example of the image distortion, in which FIG. 10A is an image distorted due to the Bc, and FIG. 10B is an image obtained by correcting the distortion;

FIGS. 11A and 11B are diagrams showing an example of a pulse sequence used in a modification of the first embodiment, in which FIG. 11A shows a 2D SE sequence, and FIG. 11B shows a 3D GE sequence;

DESCRIPTION OF THE PREFERRED EMBODIMENTS

Figure 1:
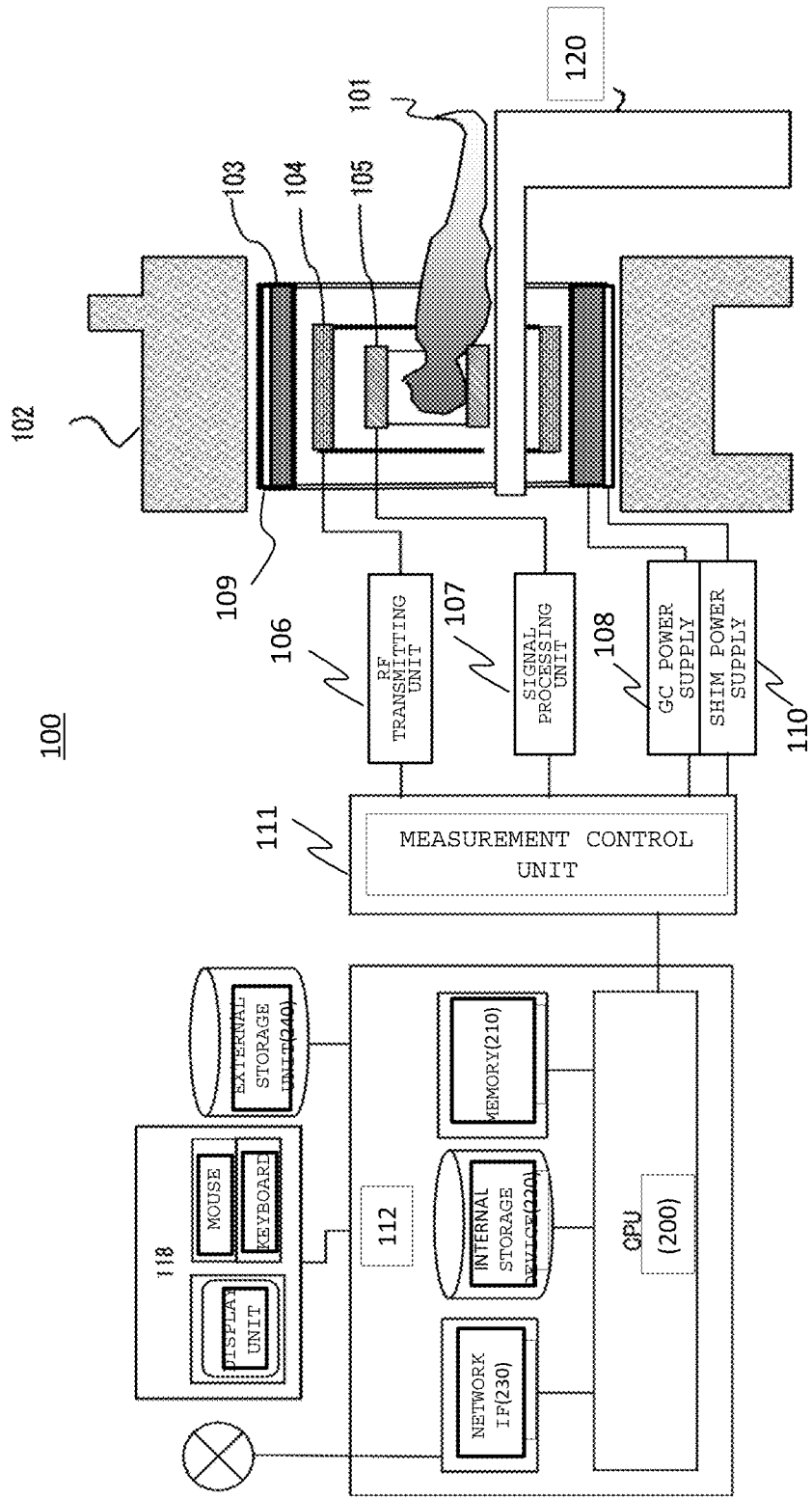
FIG. 1 is a block diagram showing an overall configuration of an MRI apparatus according to the invention.

First, an MRI apparatus according to the invention will be described with reference to FIG. 1. FIG. 1 is a block diagram showing an overall configuration of the MRI apparatus according to an embodiment of the invention.

An MRI apparatus 100 acquires a tomographic image of a subject 101 using an NMR phenomenon, and includes a static magnetic field generating magnet 102, gradient magnetic field coils 103 and a gradient magnetic field power supply 108 (a gradient magnetic field generating unit), a RF transmitting coil 104 and a RF transmitting unit 106 (a transmitting unit), a RF receiving coil 105 and a signal processing unit 107 (a receiving unit), a measurement control unit 111, an overall control unit (a control unit) 112, a display and operation unit 118, and a bed 120 including a top plate mounted with the subject 101 which is taken in and out of the inside of the static magnetic field generating magnet 102. The MRI apparatus 100 may further include shim coils 109 and a shim power supply 110 (a compensation magnetic field generating unit) that correct a static magnetic field inhomogeneity.

The static magnetic field generating magnet 102 generates homogeneous static magnetic fields in a direction orthogonal to a body axis of the subject 101 in a case of a vertical magnetic field type and in a direction of the body axis in a case of a horizontal magnetic field type, and a static magnetic field generation source of a permanent magnet type, a normal conductive type, or a superconductive type is provided around the subject 101.

Gradient magnetic field coils 103 are coils wound in three axis directions of X, Y and Z, which constitute a real space coordinate system (a stationary coordinate system) of the MRI apparatus. Each of the gradient magnetic field coils is connected to a gradient magnetic field power source 108 that drives the gradient magnetic field coil, and a current is supplied to the gradient magnetic field coil. Specifically, the gradient magnetic field power source 108 for each gradient magnetic field coil is driven according to a command from the measurement control unit 111 to be described later, and supplies a current to the gradient magnetic field coil. Accordingly, the gradient magnetic fields Gx, Gy, and Gz generate in the three axis directions of X, Y and Z. Here, the gradient magnetic field coils 103 and the gradient magnetic field power source 108 are inclusively called as a gradient magnetic field generating unit. When an image of a two-dimensional slice surface is to be measured, a slice gradient magnetic field pulse (Gs) is applied in a direction orthogonal to the slice surface (an imaging cross section) to set a slice surface with respect to the subject 101, and a phase encode gradient magnetic field pulse (Gp) and a frequency encode (readout) gradient magnetic field pulse (Gf) are applied in the two remaining directions, which are orthogonal to the slice surface and are also orthogonal to each other, to encode positional information in each direction in a nuclear magnetic resonance signal (an echo signal).

The shim coils 109 and the shim power supply 110 function as the compensation magnetic field generating unit. The shim coil 109 is a coil capable of generating a primary gradient magnetic field or a magnetic field having a spatial distribution according to a spherical harmonic of zero order or higher such as $Z^2$, XY, ZY, and XZ, is connected to the shim power supply 110, and generates a magnetic field in order to improve a static magnetic field homogeneity by a compensation current supplied from the shim power supply 110. Regarding the primary gradient magnetic field, the gradient magnetic field coil 103 may be used as the compensation magnetic field generating unit. In such a case, the gradient magnetic field power source 109 superimposes a compensation current for generating a correction magnetic field on a gradient magnetic field current for providing the positional information described above to supply to the gradient magnetic field coil 103.

The RF transmitting coil 104 is a coil that irradiates the subject 101 with an RF pulse, and is connected to the RF transmitting unit 106 to supply a high frequency pulse current. Accordingly, the NMR phenomenon is induced in spins of atoms constituting a biological tissue of the subject 101. In particular, the RF transmitting unit 106 is driven according to a command from the measurement control unit 111 to be described later to amplitude-modulate and amplify the high frequency pulse, and supplies the amplified high frequency pulse to the RF transmitting coil 104 provided adjacent to the subject 101. Accordingly, the subject 101 is irradiated with the RF pulse. Here, the RF transmitting coil 104 and the RF transmitting unit 106 are inclusively called as a transmitting unit.

The RF receiving coil 105 is a coil that receives an echo signal emitted by the NMR phenomenon of spins constituting a biological tissue of the subject 101, and is connected to the signal processing unit 107 to transmit the received echo signal to the signal processing unit 107. Here, the RF receiving coil 105 and the signal processing unit 107 are inclusively called as a receiving unit.

The signal processing unit 107 performs a process of detecting the echo signal received by the RF receiving coil 105. In particular, according to a command from the measurement control unit 111 to be described later, the signal processing unit 107 amplifies the received echo signal, divides the received echo signal into signals of two orthogonal systems by a quadrature phase detection, samples signals of each of the two orthogonal systems by a predetermined number (for example, 128, 256, 512, and the like), and executes an A/D conversion on each sampled signal to convert the sampled signal into a digital amount. Accordingly, the echo signal is acquired as time-series digital data (hereinafter, referred to as echo data) including the predetermined number of pieces of sampling data. Further, the signal processing unit 107 executes various processes on the echo data, and transmits the processed echo data to the measurement control unit 111.

The measurement control unit 111 is a control unit that mainly transmits various commands for collecting the echo data required to reconstruct a tomographic image of the subject 101 to the gradient magnetic field power source 108, the RF transmitting unit 106, and the signal processing unit 107 to control the gradient magnetic field power source 108, the RF transmitting unit 106, and the signal processing unit 107. In particular, the measurement control unit 111 operates under a control of an overall control unit 112 to be described later, controls the gradient magnetic field power source 108, the RF transmitting unit 106, and the signal processing unit 107 based on control data of a certain predetermined pulse sequence, repeatedly executes an irradiation of the subject 101 with the RF pulse, an application of the gradient magnetic field pulse, and a detection of the echo signal from the subject 101, and controls a collection of the echo data required to reconstruct an image of an imaging region of the subject 101. At the time of the repetition, the amount of phase encode gradient magnetic field is changed in the two-dimensional imaging, and the amount of a slice encoding gradient magnetic field is also changed in the three-dimensional imaging. The number of phase encodings is usually selected to be 128, 256, 512, and the like per image, and the number of slice encodings is usually selected to be 16, 32, 64, and the like. By these controls, the echo data from the signal processing unit 107 is output to the overall control unit 112.

The overall control unit 112 controls the measurement control unit 111, various data processes, display and storage of processing results, and the like, and can be constructed on a computer including a calculation processing unit (CPU) 200, a memory 210, and an internal storage unit 220 such as a magnetic disk, or a workstation. However, some of the functions of the overall control unit 112 may be implemented by hardware such as ASIC and FPGA. The overall control unit 112 implemented by such a computer or a workstation includes a network IF 230 that interfaces with an external network, and may be connected to an external storage unit 240 such as an optical disk.

In particular, the overall control unit 112 makes the measurement control unit 111 to collect the echo data by executing an imaging sequence, and when the echo data from the measurement control unit 111 is input, the CPU 114 stores the echo data in a region corresponding to a k space in a memory 210 based on encoding information applied to the echo data. Storing the echo data in the region corresponding to the k space in the memory 210 is also referred to as "allocating the echo data in the k space" in the following description. An echo data group stored in the region corresponding to the k space in the memory 210 is also referred to as k space data.

The calculation processing unit (CPU) 200 executes a process such as a signal process and an image reconstruction by Fourier transform on the k space data, displays an image of the subject 101 which is a result of the processes on the display and operation unit 118, and records the image in an internal storage unit 210 or an external storage unit 240 or transfers the image to an external device via the network IF 230.

The display and operation unit 118 includes a display unit that displays the reconstructed image of the subject 101, and an operation unit such as a trackball or a mouse and a keyboard for receiving input of various types of control information of the MRI apparatus and control information of processes executed by the overall control unit 112 described. The operation unit is provided adjacent to the display unit, and an operator interactively controls various processes of the MRI apparatus via the operation unit while looking at the display unit.

In the MRI apparatus according to the present embodiment, in addition to a function as an image generating unit that executes the image reconstruction described above, the calculation processing unit 200 further has a function as a static magnetic field inhomogeneity (Bc) estimating unit that estimates a static magnetic field inhomogeneity caused by application of the gradient magnetic field based on a pulse sequence used for actual imaging, which will be described in detail later. Based on the static magnetic field inhomogeneity estimated by the Bc estimating unit, the calculation processing unit 200 performs a process such as image correction, generation of a compensation current correcting the static magnetic field inhomogeneity or the like. Hereinafter, embodiments of an MRI apparatus having a function for estimating and processing static magnetic field inhomogeneity will be described.

FIRST EMBODIMENT

The MRI apparatus according to a first embodiment estimates, based on the pulse sequence used for imaging, the static magnetic field inhomogeneity Bc generated by applying the gradient magnetic field at the time of imaging, and calculates a correction value for correcting an image quality deterioration due to the static magnetic field inhomogeneity based on the estimated static magnetic field inhomogeneity and corrects the image quality deterioration.

Figure 2:
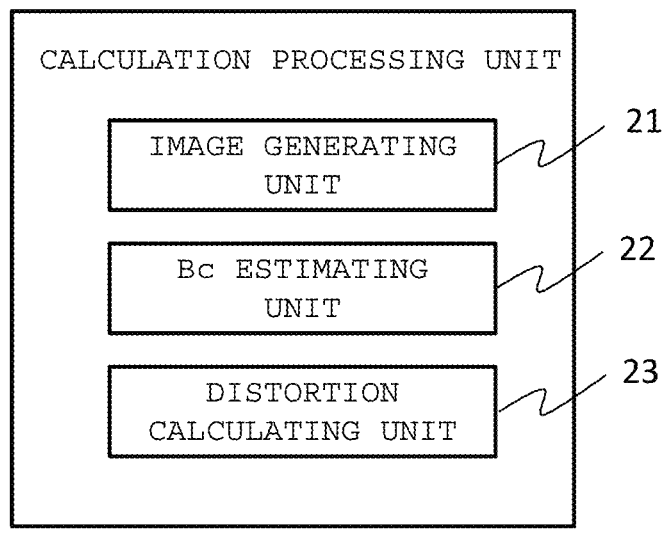
FIG. 2 is a functional block diagram of a calculation processing unit according to a first embodiment.

As shown in FIG. 2, the calculation processing unit 200 according to the present embodiment includes an image generating unit 21 that reconstructs an image using the k space data, a Bc estimating unit 22 that estimates the static magnetic field inhomogeneity based on the pulse sequence, and a distortion calculating unit 23 that calculates a distortion generated in an image based on the static magnetic field inhomogeneity estimated by the Bc estimating unit 22.

Figure 3:
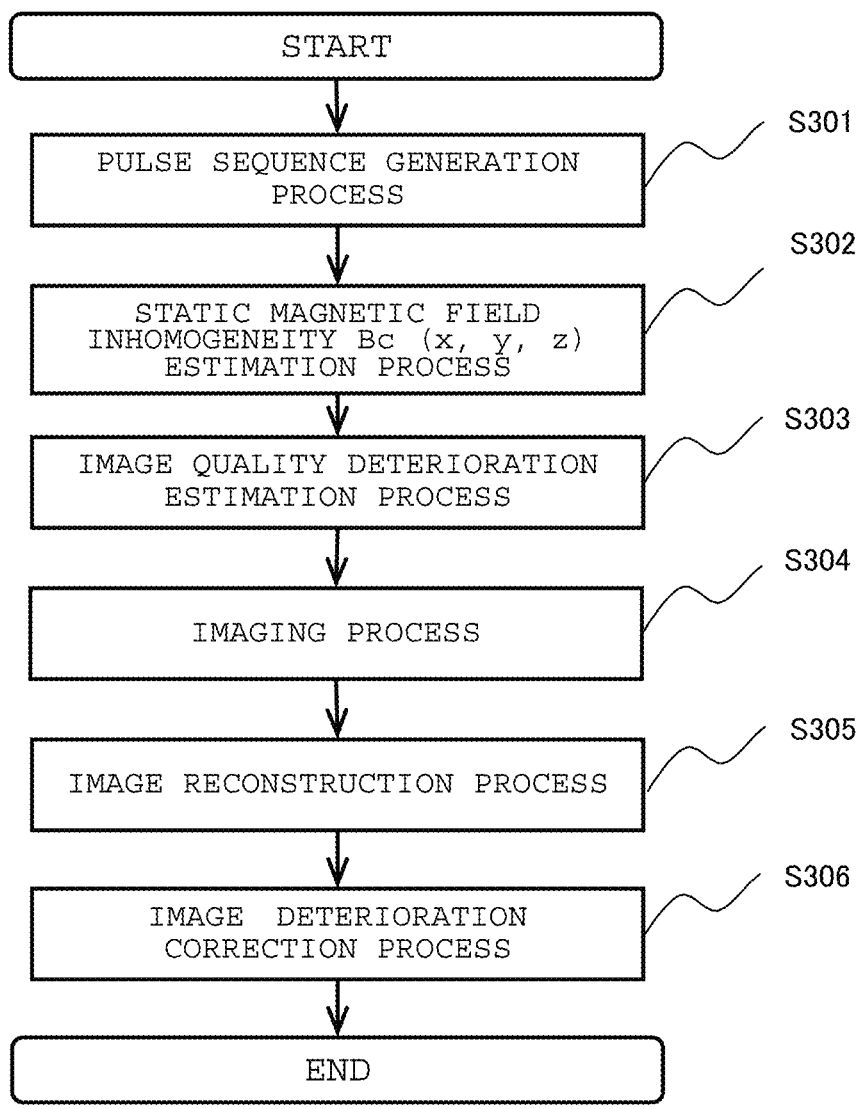
FIG. 3 is a flow diagram showing an estimation of a static magnetic field inhomogeneity and an image correction process according to the first embodiment.

Hereinafter, processes of the MRI apparatus including the above-described calculation processing unit 200 will be described with reference to FIG. 3.

Figure 4:
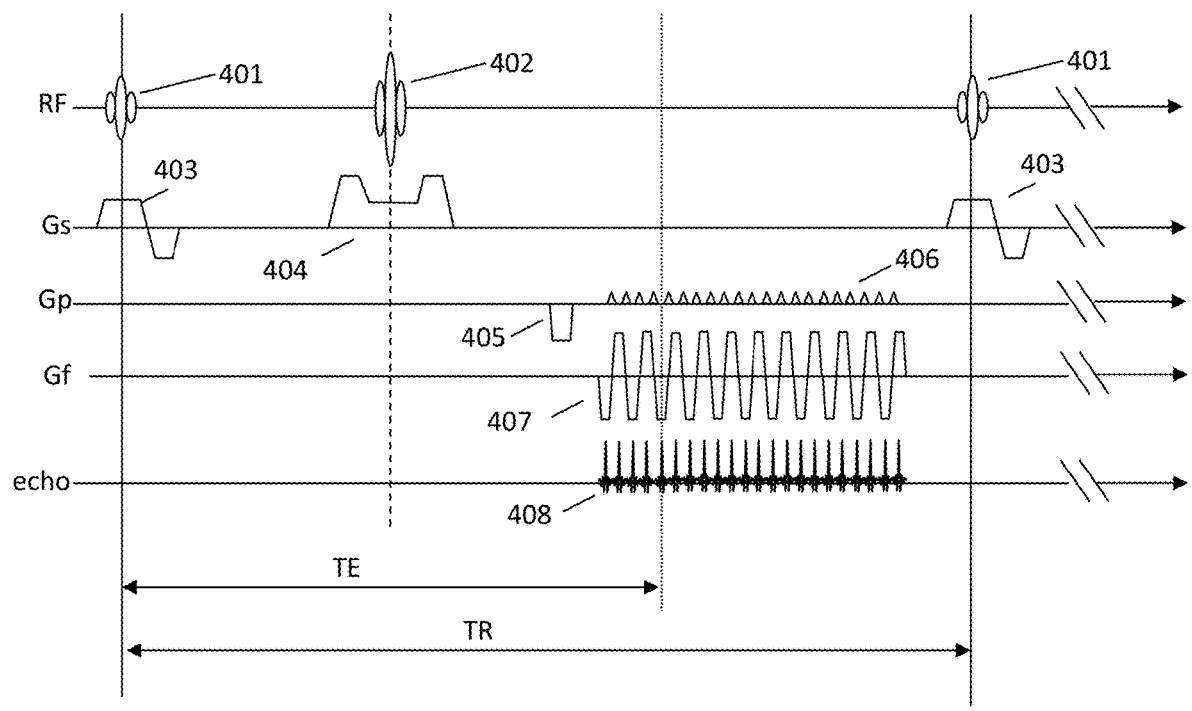
FIG. 4 is a diagram showing an example of a SE EPI sequence chart.

First, when the pulse sequence and imaging parameters are set, the measurement control unit 111 generates a pulse sequence (hereinafter, referred to as an imaging sequence) used for imaging (S301). Here, as an example, it is assumed that the imaging sequence is a SE EPI sequence. FIG. 4 shows an example of the SE EPI sequence.

In the SE EPI sequence, as shown in FIG. 4, an excitation RF pulse (a pulse of 90 degrees) 401 is applied together with a slice selection gradient magnetic field pulse 403, and further, an inversion RF pulse (a pulse of 180 degrees) 402 is applied together with a slice selection gradient magnetic field pulse 404 at a timing of TE (echo time)/2. Thereafter, echo signals 408 are acquired in one shot while a polarity of a frequency encode (readout) gradient magnetic field pulse (Gf) 407 is switched at a high speed and a Blip pulse 406 is applied to the phase encode gradient magnetic field. A phase encode gradient magnetic field pulse 405 is a dephasing pulse. Although the Blip pulse is used in a phase encode direction in FIG. 4, the gradient magnetic field may be kept applied while the echo signal is collected.

When the imaging sequence is determined, the Bc estimating unit 22 simply estimates the static magnetic field inhomogeneity using the application strength or the average application strength of the gradient magnetic field pulse included in the imaging sequence (S302). Since the static magnetic field inhomogeneity caused by the gradient magnetic field pulse changes with time according to an output of the gradient magnetic field, a complex calculation is required for strictly acquiring the static magnetic field inhomogeneity, and it is difficult to acquire the static magnetic field inhomogeneity in real time. According to the first embodiment, the static magnetic field inhomogeneity is simply estimated by removing a time element.

That is, it is widely known that the static magnetic field inhomogeneity Bc caused due to the Maxwell terms to be generated when the gradient magnetic field is applied can be calculated using the following Equation (1).

$$Bc(x, y, z, t) \propto \frac{G_r^{n+1}}{B_0^n} (n = 1, 2 \ldots) \approx \tag{1}$$

$$\frac{1}{2B_0}\left\{(G_x(t)^2 + G_y(t)^2)z^2 + G_z(t)^2\frac{x^2+y^2}{4} - G_x(t)G_y(t)xz - G_y(t)G_z(t)yz\right\}$$

$x, y, z$: position in real space [m]

$t$: time (ms)

Figure 5:
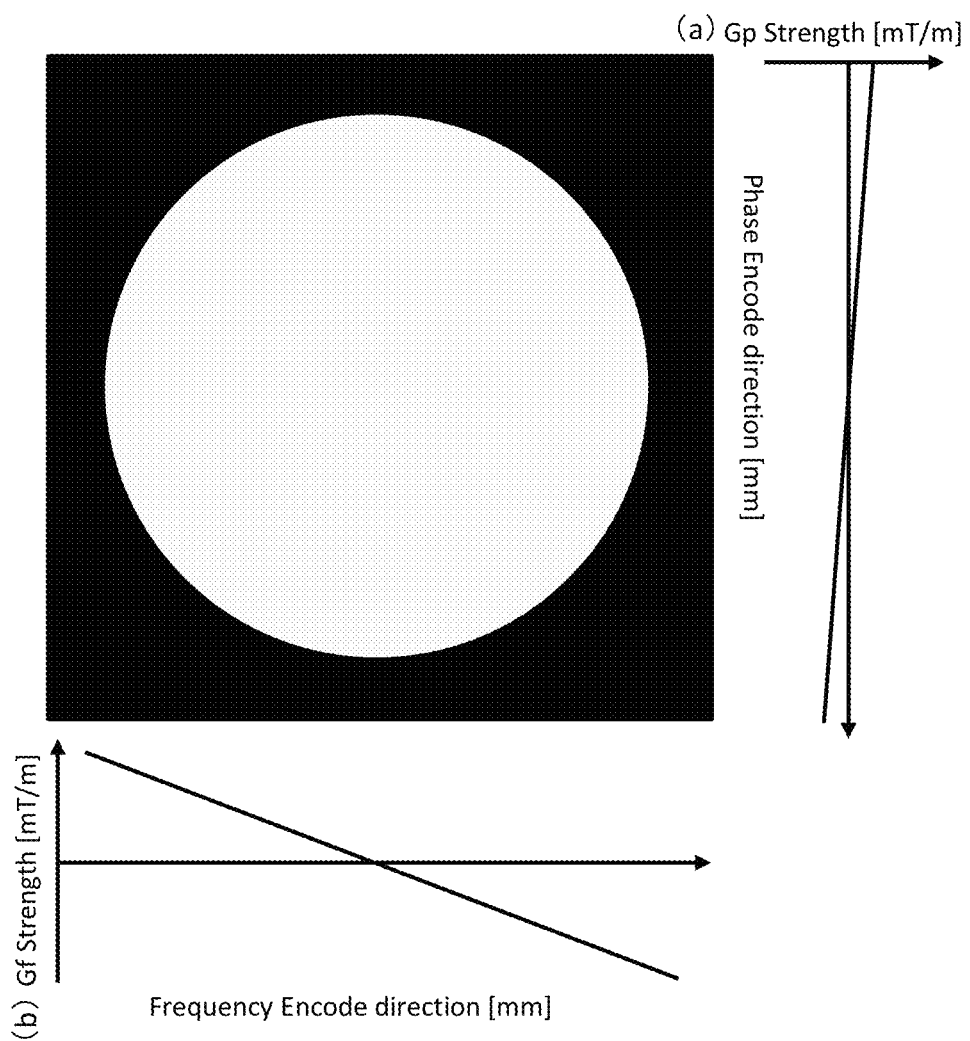
FIG. 5 a diagram showing strengths of gradient magnetic fields applied in a phase encode direction and a frequency encode direction of an image.

$G_x, G_y, G_z$: strength of gradient magnetic field on each axis $[\text{mT/m}]$ As can be seen from Equation (1), the Bc is a function on strengths of the gradient magnetic field of axes that change with time. In the EPI sequence adopted in the present embodiment, the strengths of the gradient magnetic fields applied in the frequency encode direction and the phase encode direction can be expressed by slopes as shown in FIG. 5 when the strengths are shown in a direction of a real space (an image space). The magnitude of the slope is the strength of the gradient magnetic field. Although the echo signal is actually acquired while the strength of the gradient magnetic field is switched, it can be considered that a fixed strength of the gradient magnetic field as shown in FIG. 5 is virtually applied. The Bc estimating unit 22 according to the present embodiment determines that the fixed strength of the gradient magnetic field is applied, and uses Equation (2) in which the time element is removed instead of the above Equation (1). Accordingly, the static magnetic field inhomogeneity can be simply calculated.

$$Bc(x, y, z) = \frac{1}{2B_0}\left\{(G_x^2 + G_y^2)z^2 + G_z^2\frac{x^2+y^2}{4} - G_xG_yxz - G_yG_zyz\right\} \tag{2}$$

$x, y, z$: position in real space [m]

Figure 6:
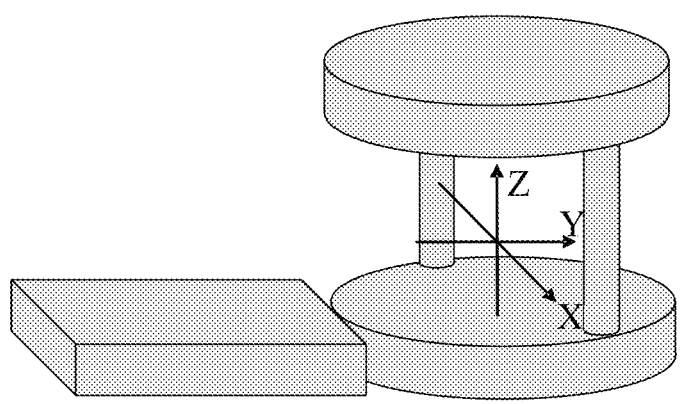
FIG. 6 is a diagram showing an example of an absolute coordinate of a vertical magnetic field device.

$G_x, G_y, G_z$: strength of gradient magnetic field on each axis $[\text{mT/m}]$ For example, in a MRI apparatus of a vertical magnetic field type as shown in FIG. 6, when a slice direction is a Y axis, the phase encode direction is a Z axis, and the frequency encode direction is an X axis, since the gradient magnetic field is not applied in the slice direction when the echo signal is acquired in the SE EPI sequence in FIG. 4, Gy is 0 mT/m, Gx is a strength of a frequency encode gradient magnetic field, and Gz is a strength of a phase encode gradient magnetic field (Blip). The application strength of one frequency encode gradient magnetic field pulse 408 in FIG. 4 is the strength of the frequency encode gradient magnetic field. Although the strength of the phase encode gradient magnetic field may be the application strength of one Blip, since the Blip pulse 406 is usually triangular rather than trapezoidal, an average application strength of one phase encode gradient magnetic field pulse 406 is used.

Figure 7:
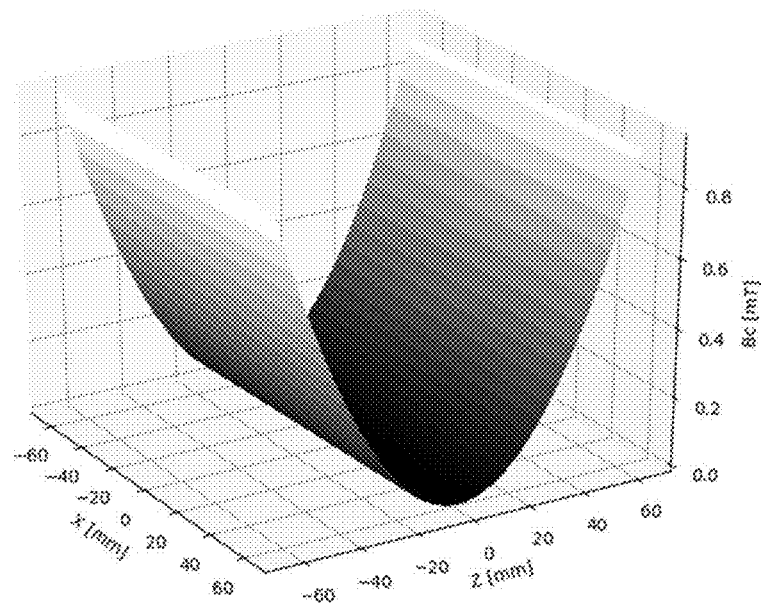
FIG. 7 is a diagram showing an estimation example of a static magnetic field inhomogeneity occurring in a XZ plane.

A Bc (x, y, z) can be acquired by substituting these Gx, Gy, and Gz into Equation (2). An example of the static magnetic field inhomogeneity Bc calculated in this way is shown in FIG. 7. In FIG. 7, the static magnetic field inhomogeneity Bc to be generated in an xz plane is estimated at a center position (y=0) in the slice direction. As shown in FIG. 5, the strength (b) of the frequency encode gradient magnetic field Gx is greater than the strength (a) of the phase encode gradient magnetic field Gy. Among four terms ($z^2$, $(x^2+y^2)/4$, xz, yz) included on the right side of Equation (2), the first term ($Gx^2z^2$) is dominant, and has a distribution as shown in FIG. 7 in which the static magnetic field inhomogeneity in the z direction is a quadratic function of z.

Next, the distortion calculating unit 23 estimates the amount of distortion of the image by substituting the Bc estimated by the Bc estimating unit 22 and the Gx and Gz substituted in Equation (2) into the following Equation (3) (an image quality deterioration estimation process S303).

$$\text{distortion}_x(z, x)[m] = \frac{B_c(x, y, z)[\text{mT}]}{G_x[\text{mT/m}]} \tag{3}$$

$$\text{distortion}_z(z, x)[m] = \frac{B_c(x, y, z)[\text{mT}]}{G_z[\text{mT/m}]}$$

Figure 8:
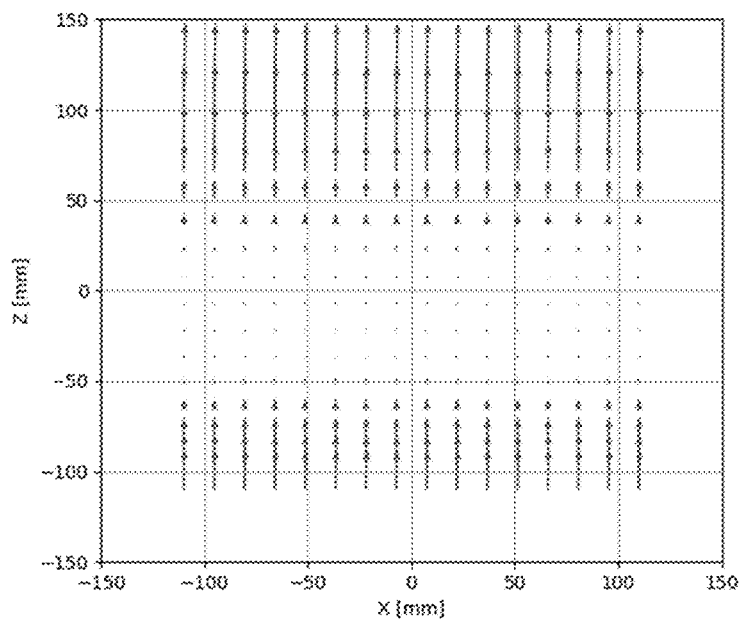
FIG. 8 is a vector expression diagram showing an amount of image distortion due to a static magnetic field inhomogeneity Bc.
Figure 9A:
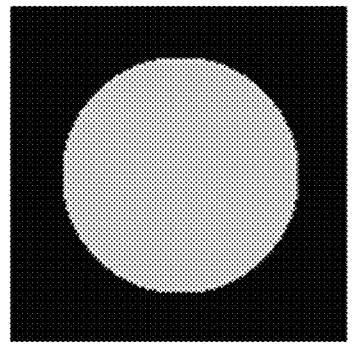
Figure 9B:
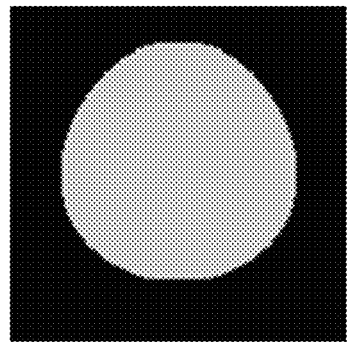

FIG. 8 shows an example in which the amount of distortion when an image is measured with a FOV of 300 mm at the center of the magnetic field for the slice position y=0 is expressed as a vector. FIGS. 9A and 9B show an example in which the image is distorted according to the amount of distortion in FIG. 8. FIG. 9A is an image acquired without distortion, FIG. 9B is an image acquired by distorting the image in FIG. 9A, and a vertical direction of a paper surface is the phase encode direction (the Z direction). In this example, it can be understood that a large distortion occurs in a phase direction (a Z axis).

Figure 10A:
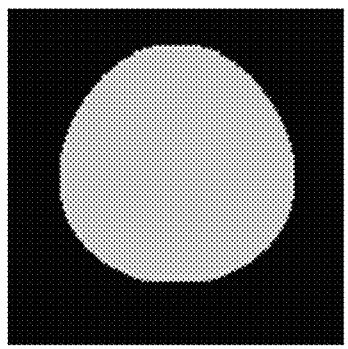
Figure 10B:
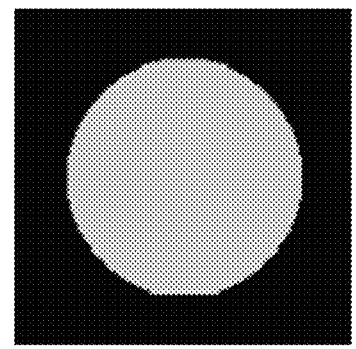

When the imaging sequence is set in the measurement control unit 111 by the pulse sequence generation process S301 described above, the imaging is started and the k space data is collected under the control of the measurement control unit 111 (S304), and the image generating unit 21 executes a reconstruction process such as Fourier transform on the acquired k space data to acquire an image (S305). A distortion due to the gradient magnetic field is generated in this image, and it can be estimated that the amount of this distortion is approximately the amount of distortion calculated in S303. Therefore, the image generating unit 21 deforms the reconstructed image in a reverse direction using the estimated amount of distortion (S306). That is, an inverse vector of a distortion vector as shown in FIG. 8 is used as a matrix, and the image is transformed by a general image process such as Affine transform to correct the distortion. Accordingly, a corrected image as shown in FIG. 10B can be acquired based on the distorted image as shown in FIG. 10A.

By the above steps S301 to S306, using the pulse sequence actually used for imaging, it is possible to simply correct the distortion applied on the image due to the static magnetic field inhomogeneity caused by the gradient magnetic field.

In FIG. 6, although a case in which the coordinate axes (X, Y, Z) of the apparatus match with the slice axis, the frequency encode axis, and the phase encode axis is taken as an example, in general, the pulse sequence is often created with a relative coordinate system having a slice axis, a phase encode axis, and a frequency encode axis, and in some cases, it is impossible to acquire information on an absolute coordinate system in which an oblique (a rotation) or the like is taken into account. In such a case, the relative coordinate system (x', y', z') may be converted to the absolute coordinate system (x, y, z) using the following Equation (4). In Equation (4), Rx, Ry, and Rz are matrices representing an oblique. Similarly, the strength of the gradient magnetic field may be calculated after being expanded in the absolute coordinate system.

$$\begin{bmatrix} x \\ y \\ z \end{bmatrix} = R_x(\theta_x)R_y(\theta_y)R_z(\theta_z)\begin{bmatrix} x' \\ y' \\ z' \end{bmatrix} \quad (4)$$

$$Rx(\theta_x) = \begin{bmatrix} 1 & 0 & 0 \\ 0 & \cos\theta_x & -\sin\theta_x \\ 0 & \sin\theta_x & \cos\theta_x \end{bmatrix}$$

$$Ry(\theta_y) = \begin{bmatrix} \cos\theta_y & 0 & \sin\theta_y \\ 0 & 1 & 0 \\ -\sin\theta_y & 0 & \cos\theta_y \end{bmatrix}$$

$$Rz(\theta_z) = \begin{bmatrix} \cos\theta_z & -\sin\theta_z & 0 \\ \sin\theta_z & \cos\theta_z & 0 \\ 0 & 0 & 1 \end{bmatrix}$$

$\theta_x, \theta_y, \theta_z$: rotation angle with respect to each axis

As described above, according to the present embodiment, it is possible to omit the preliminary measurement of the static magnetic field inhomogeneity caused by the application of the gradient magnetic field, by simply estimating the static magnetic field inhomogeneity based on the strength of the gradient magnetic field determined by the imaging sequence, and flexibility of setting an imaging condition can be increased. Since a component that affects the image can be corrected intensively, a high image quality improvement effect can be simply attained.

Modification of First Embodiment

In the first embodiment, an example using the SE EPI sequence as the imaging sequence has been described, but the invention can be applied to other sequences as well. Here, a case in which a 2D SE sequence is used as another sequence will be described.

Figure 11A:
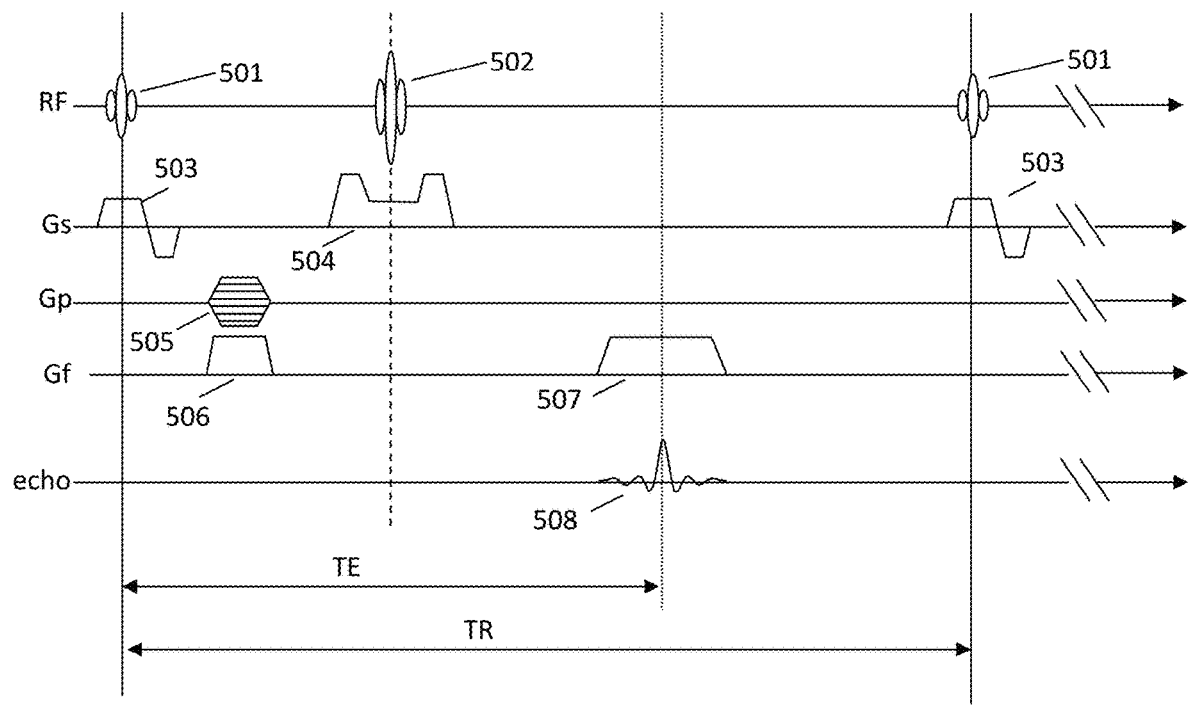

As shown in FIG. 11A, a general 2D SE sequence applies an excitation RF pulse 501 together with a slice selection gradient magnetic field pulse 503, then applies an inversion RF pulse 502 together with a slice selection gradient magnetic field pulse 504 to generate an echo signal 508 which has a peak at an echo time (TE), and applies a readout gradient magnetic field (a frequency encode gradient magnetic field pulse) 507 to collect the echo signal 508. In addition, the phase encode is applied to the echo signal 508 to be generated by applying a phase encode gradient magnetic field pulse 505 together with a dephasing phase 506 of the frequency encode gradient magnetic field pulse 507 between the excitation RF pulse 501 and the inversion RF pulse 502. This sequence is repeated in TR to collect the k space data.

Regarding such a SE sequence, as in the first embodiment, the static magnetic field inhomogeneity Bc at the time of executing the pulse sequence can be estimated using Equation (2) in which the time element is removed for the strength of the gradient magnetic field.

As an example, considering a case in which the slice direction is the Y axis, the phase encode direction is the Z axis, and the frequency encode direction is the X axis for the MRI apparatus of a vertical magnetic field type shown in FIG. 6, since the gradient magnetic field is not applied in the slice direction when the echo signal is acquired, the Gy in Equation (2) is 0 mT/m, and the Gx is the strength (the pulse height) of the frequency encode gradient magnetic field 507. Since the strength is different each time the phase encode gradient magnetic field 505 is repeated, an average value of the phase encode gradient magnetic fields of all repetitions is substituted as the Gz. Normally, since the phase encode applies the same strength to positive and negative directions, the actual Gz is 0 mT/m. The Bc (x, y, z) can be estimated by substituting the Gx, Gy, and Gz into Equation (2). Regarding a case of oblique imaging, the Bc (x, y, z) can be estimated in the same manner as in the first embodiment by expanding the coordinate system of the oblique in the absolute coordinate system using Equation (4).

Using the static magnetic field inhomogeneity estimated in this way to calculate the amount of distortion generated in the image using Equation (3), and correcting the reconstructed image with the calculated amount of distortion are the same as in the first embodiment.

Figure 11B:
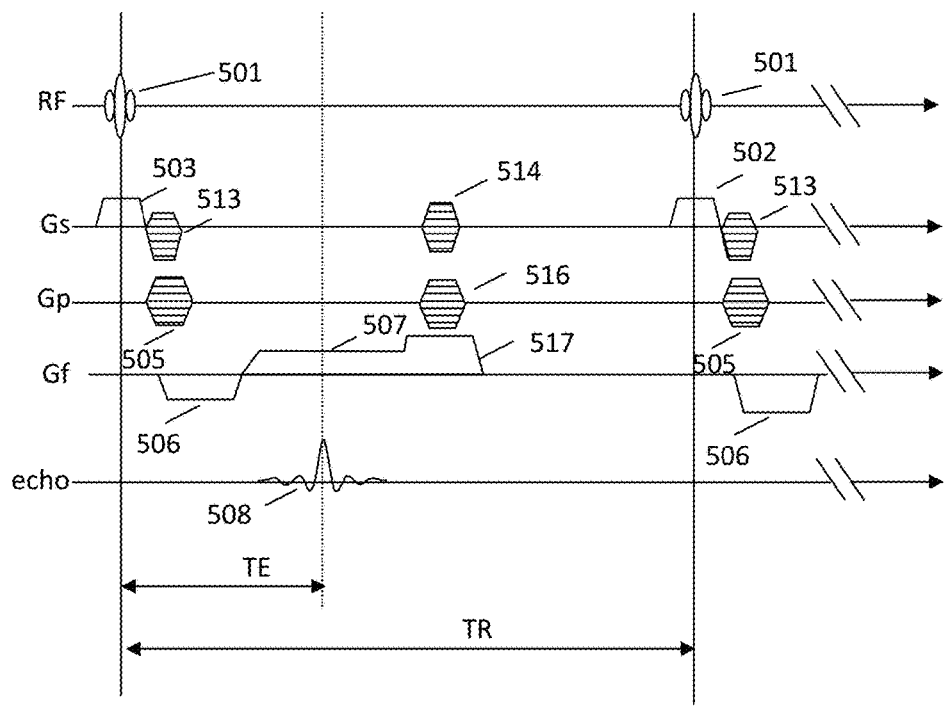

The modification applied to the 2D SE sequence has been described above, and the same applies to 3D. FIG. 11B shows an example of a 3D GE sequence. In FIG. 11B, the same elements as in FIG. 11A are indicated by the same reference numerals. In this GE sequence, the echo signal 508 is generated and measured by inverting the readout gradient magnetic fields 506 and 507 without using the inversion RF pulse. As a main difference from the 2D sequence, a slice encoding gradient magnetic field 513 is applied. The gradient magnetic field pulses 514, 516, and 517 are rewind pulses for the axes.

When the static magnetic field inhomogeneity is calculated for such a 3D sequence, similar to the strength of the phase encode gradient magnetic field in the SE-sequence, an average value of the strengths of the slice encoding gradient magnetic fields of all repetitions may be substituted in Equation (2) as a value of the strength of the slice gradient magnetic field. For example, when the slice direction is the Y axis, the average value of the strength of the slice encoding gradient magnetic field is substituted as the Gy. Normally, since an amount of encoding is the same for the positive and negative directions, the amount of encoding is 0 mT/m on average. The other axes are the same as in the 2D sequence.

SECOND EMBODIMENT

In the first embodiment, the static magnetic field inhomogeneity and the amount of distortion of the image are estimated based on the shape of the pulse sequence by a simple calculation, and the image quality deterioration is corrected. In the second embodiment, the accuracy on the amount of distortion calculated by the distortion calculating unit is improved using a result of the preliminary measurement using a phantom or the like.

Although the static magnetic field inhomogeneity to be estimated in the first embodiment is a static magnetic field inhomogeneity caused by the application of the gradient magnetic field during imaging, a slight inhomogeneity is present in an original strength of the static magnetic field. Although the gradient magnetic field is designed to be a gradient magnetic field centered on the center of the static magnetic field, in practice, the center of the gradient magnetic field may deviate slightly from the center of the static magnetic field. In the present embodiment, such an inhomogeneity and a deviation are acquired as adjustment values and are used to adjust the amount of distortion. In particular, when an adjustment value for eliminating an error between an estimated value and a measured value of the static magnetic field inhomogeneity is added, Equation (2) for calculating the static magnetic field inhomogeneity Bc is expressed as the following Equation (5).

$$Bc(x, y, z) = \frac{1}{2B_0}\left\{C_{Z2}(G_x^2 + G_y^2)(z + \Delta z)^2 + C_{XY}G_z^2\frac{(x + \Delta x)^2 + (y + \Delta y)^2}{4} - C_{XZ}G_xG_y(x + \Delta x)(z + \Delta z) - C_{YZ}G_yG_z(y + \Delta y)(z + \Delta z)\right\} \quad (5)$$

$x, y, z$: position in real space [m]

$G_x, G_y, G_z$: strength of gradient magnetic field on each axis [mT/m]

$G_{z2}, G_{xy}, G_{xz}, G_{yz}$: correction coefficient $\Delta x, \Delta y, \Delta z$: position correction value In Equation (5), $C_{z2}$, $C_{XY}$, $C_{XZ}$, and $C_{YZ}$ are coefficients (correction coefficients) for adjusting the strength of the static magnetic field inhomogeneity, and $\Delta x$, $\Delta y$, and $\Delta z$ are correction values (position correction values) for adjusting the center position of the magnetic field. In the present embodiment, the amount of distortion adjusted to include the correction coefficients and the position correction values is calculated.

Hereinafter, the present embodiment will be described focusing on differences from the first embodiment.

Figure 12:
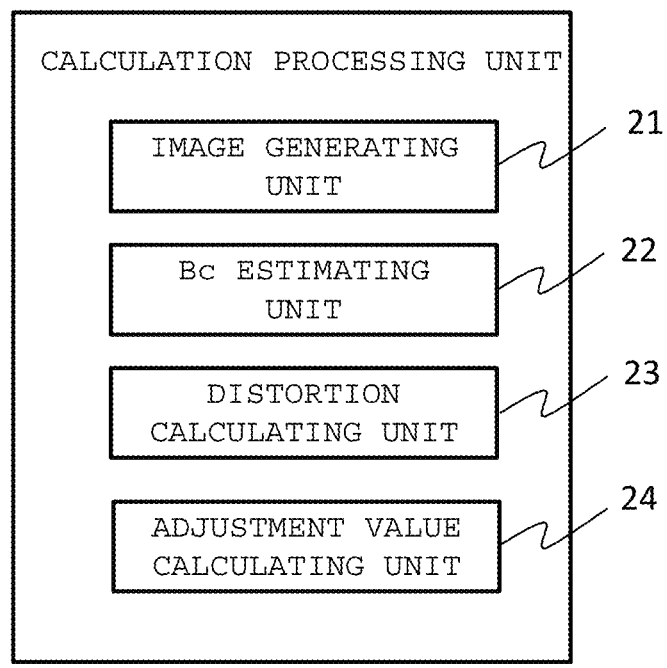
FIG. 12 is a functional block diagram of a calculation processing unit according to a second embodiment.

Functions of the calculation processing unit 200 according to the present embodiment are shown in FIG. 12. In FIG. 12, the same elements as those in FIG. 2 are indicated by the same reference numerals, and redundant descriptions will be omitted. As shown in FIG. 12, in addition to the image generating unit 21, the Bc estimating unit 22 that estimates the static magnetic field inhomogeneity, and the distortion calculating unit 23, the calculation processing unit 200 includes an adjustment value calculating unit 24 that calculates an adjustment value for adjusting the amount of distortion calculated by the distortion calculating unit 23. The amount of distortion can be calculated in the same manner as in the first embodiment (FIG. 3: S301 to S303).

Hereinafter, an example of a process executed by the adjustment value calculating unit 24 will be described with reference to FIG. 13.

First, before capturing an image of the subject, two times of preliminary imaging are executed using a phantom or the like (S601 and S602). In one time of preliminary imaging, a reference image is measured under a condition that the influence of the static magnetic field inhomogeneity Bc is less likely to be received (S601). As the imaging under the condition that the influence of the static magnetic field inhomogeneity is less likely to be received, for example, a gradient echo sequence or a spin echo sequence may be adopted. In the case of the EPI sequence, in order to reduce the influence of the distortion, the strength of the gradient magnetic field of the Blip pulse may be increased and the amount of the distortion may be reduced by setting multi-shot. In the other time of imaging, an adjustment image is measured under a condition that a large amount of distortion occurs (S602). For example, a single shot EPI sequence or the like is used. Although these two times of imaging may be executed first or later, it is preferable to execute these two times of imaging prior to the actual imaging (FIG. 3: S304). For example, these two times of imaging may be executed at the time of adjustment of the MRI apparatus, and the adjustment value to be acquired after these two times of imaging may be registered in advance.

Next, a repeated calculation for calculating the adjustment value of the amount of distortion is executed using the reference image and the adjustment image (S603 to S606). First, an initial value of the adjustment value for adjusting the static magnetic field inhomogeneity is set (S603). A value that can be taken as the adjustment value, for example, a value selected from an empirically predictable range can be used as the initial value of the adjustment value (the correction coefficients and the position correction values). Next, the distortion of the adjustment image is corrected using this adjustment value (S604). This process is the same as the processes (FIG. 3: S302 to S304) according to the first embodiment except for using Equation (5) instead of Equation (2) as a calculation equation for estimating the static magnetic field inhomogeneity used to calculate the distortion. That is, based on the pulse sequence by which the adjustment image is measured, the strength of the gradient magnetic field and the adjustment value set as the initial value are substituted into Equation (5) to estimate the static magnetic field inhomogeneity Bc, and the amount of distortion is calculated using Equation (3). The adjustment image is corrected using the calculated amount of distortion.

Next, a similarity between the corrected adjustment image and the reference image is calculated (S605). A general image processing technique, for example, a normalized cross correlation or the like can be used to calculate the similarity. Then, S603 to S605 are repeated using a different adjustment value.

The repeated calculation may be repeated by exhaustively making values in the range of values that can be taken as the adjustment value different. In the example shown in FIG. 13, a search range of the adjustment value is determined in advance, the search range of the adjustment value is updated (S606) after S603 to S605 are executed with the adjustment value in the predetermined search range, and the repeated calculation is executed. As a range update method, for example, the adjustment value is assigned over a wide range to search an adjustment value showing a high similarity, and in the next step, the search range is narrowed down to a vicinity of the adjustment value to search the adjustment value. It is possible to efficiently derive an optimum adjustment value by repeating such a search while narrowing down the range.

Finally, the adjustment value having the highest similarity is registered in a storage device 220 or the like of the MRI apparatus (S607). The registered adjustment value is used when the Bc estimating unit 22 calculates the static magnetic field inhomogeneity.

After the adjustment value is registered by such a preliminary measurement, an image of the subject is measured. The flow of imaging is the same as that according to the first embodiment and the modification thereof. According to the flow (S301 to S306) shown in FIG. 3, estimation of the static magnetic field inhomogeneity, imaging, image reconstruction, image correction, and the like are executed. However, in the present embodiment, the Bc estimating unit substitutes the adjustment value registered by the preliminary measurement and the strength of the gradient magnetic field acquired based on the imaging sequence into Equation (5) to execute the estimation process (S302) of the static magnetic field inhomogeneity.

According to the present embodiment, since the static magnetic field inhomogeneity and the amount of image distortion can be acquired by adjusting errors of each apparatus of the static magnetic field inhomogeneity caused by the application of the gradient magnetic field or the deviation of the gradient magnetic field from the center of the static magnetic field, it is possible to execute a highly accurate correction of the image quality deterioration.

First Modification of Second Embodiment

In the second embodiment, an example of calculating the adjustment value by the repeated calculation (FIG. 13) is described as an example of the process for calculating the adjustment value by the adjustment value calculating unit 24. As another example, a method of back-calculating the adjustment value without repeating the calculation using the property of the magnetic field inhomogeneity may be adopted.

As shown in FIG. 7, when the phase encode direction is set as the Z axis direction, the magnetic field inhomogeneity has a dominant distribution in the form of a quadratic function with the center (z=0) of the magnetic field as a local minimum. That is, the error between the position where the distortion of the image is the smallest and the position of the center (the magnetic field center) of the image is $\Delta z$. Since the distribution in the Z axis direction is dominant, it would be clearly understood that the correction accuracy is improved by optimizing the coefficient $C_{z2}$ of the first term on the right side of Equation (5).

In the present modification, by taking advantage of this fact, the correction coefficient of the first term on the right side of Equation (5) is simply calculated based on only this term using the error $\Delta z$ at the center position of the image.

The error $\Delta z$ at the center position of the image can be calculated as the deviation between the center position of the reference image and the center of the adjustment image whose distortion is corrected at $\Delta z=0$. The magnetic field inhomogeneity Bc is calculated by multiplying the error $\Delta z$ by the strength of the gradient magnetic field of the Gz (Equation (3)). Next, in Equation (5), the correction coefficients other than $C_{z2}$ are set to 0, the magnetic field inhomogeneity calculated as described above is substituted into Equation (5), and the $C_{z2}$ is back-calculated.

According to this method, the repeated calculation is not required, and the adjustment value in the Z axis direction that has a great influence can be simply acquired. The repeated calculation in FIG. 13 may be executed using the adjustment value acquired with this method as the initial value to search the optimum value.

Second Modification of Second Embodiment

In the second embodiment, the adjustment value (the correction coefficients) of the static magnetic field inhomogeneity is calculated when a slice center position is the center of the magnetic field center, but the adjustment value may be different depending on a spatial position.

Figure 14:
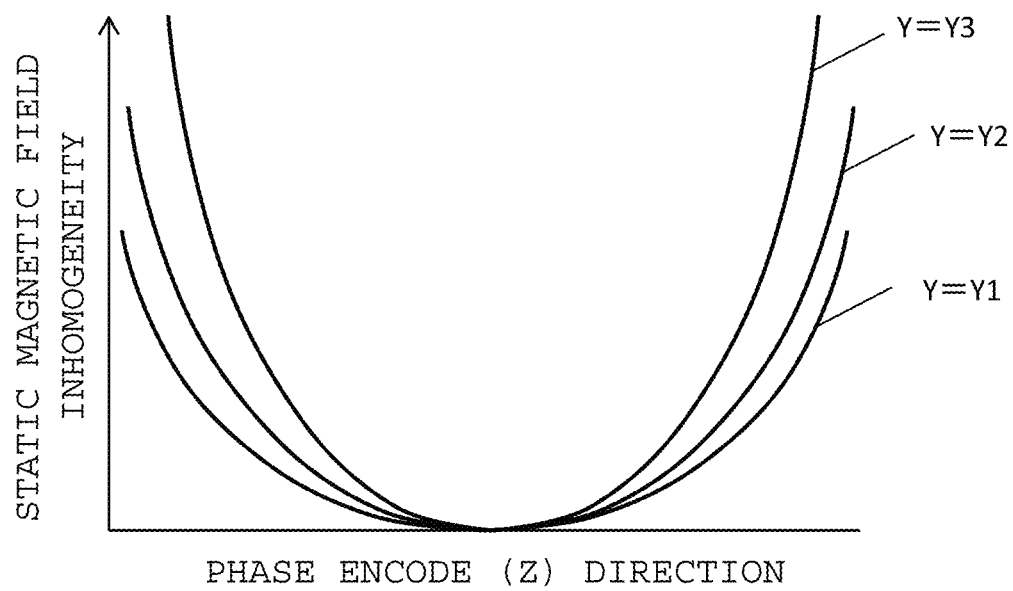
FIG. 14 is a diagram illustrating a static magnetic field inhomogeneity that differs depending on slice positions.

Normally, imaging is executed such that the center (the slice center) of the image is the center of the magnetic field. When an image of a relatively wide range is measured along the slice direction, however, the image may be measured by shifting the slice position from the center of the magnetic field. The magnetic field inhomogeneity in the Z axis direction, which is dominant in the magnetic field inhomogeneity, has the distribution in the form of a quadratic function as shown in FIG. 7. When the position in the slice direction (the Y direction) changes, the distribution may change due to the influence of the error in the output of the static magnetic field or the output of the gradient magnetic field or the like as schematically shown in FIG. 14.

In the present modification, when the adjustment value is acquired by the preliminary imaging (FIG. 13: steps S601 and S602), by capturing an image at the slice position which is an off-center from the center of the magnetic field, the magnetic field inhomogeneity over a wide range of a magnetic field space is measured, and different adjustment values are calculated for each slice position and registered in advance. Therefore, a position dependent of the correction effect can be improved by applying the adjustment value corresponding to each slice position.

Furthermore, as another modification, conditions such as a reception bandwidth (BW) when the reference image and the adjustment image are measured may be changed to calculate the amount of distortion with a different strength of the gradient magnetic field, and the adjustment value may be set as a function according to the strength of the gradient magnetic field. Accordingly, high correction accuracy can be achieved without being affected by local inhomogeneity in the static magnetic field space or a non-linearity of the output of the gradient magnetic field.

THIRD EMBODIMENT

In the first and second embodiments, the distortion of the image is corrected as a post-process using the estimated static magnetic field inhomogeneity. In a third embodiment, the output of the shim coil (the compensation magnetic field generating unit) that corrects the estimated static magnetic field inhomogeneity is calculated, and the compensation magnetic field is output in advance from the shim coil to reduce the image quality deterioration.

The correction of the static magnetic field inhomogeneity caused by the application of the gradient magnetic field according to the third embodiment is not a matter of controlling the compensation magnetic field in real time, which is a technique in the related art, but a matter of outputting a constant compensation magnetic field in advance. Therefore, the versatility and accuracy from the viewpoint of reducing the image quality deterioration are lowered as compared to the case of correction in real time, but the distortion of the image can be simply corrected and a high degree of responsiveness to the gradient magnetic field coils is not required. Therefore, in an MRI apparatus such as a low magnetic field device or the like, in which the static magnetic field inhomogeneity due to the application of the gradient magnetic field has a great influence to the image quality deterioration, an excellent distortion removing effect can be simply achieved.

Figure 15:
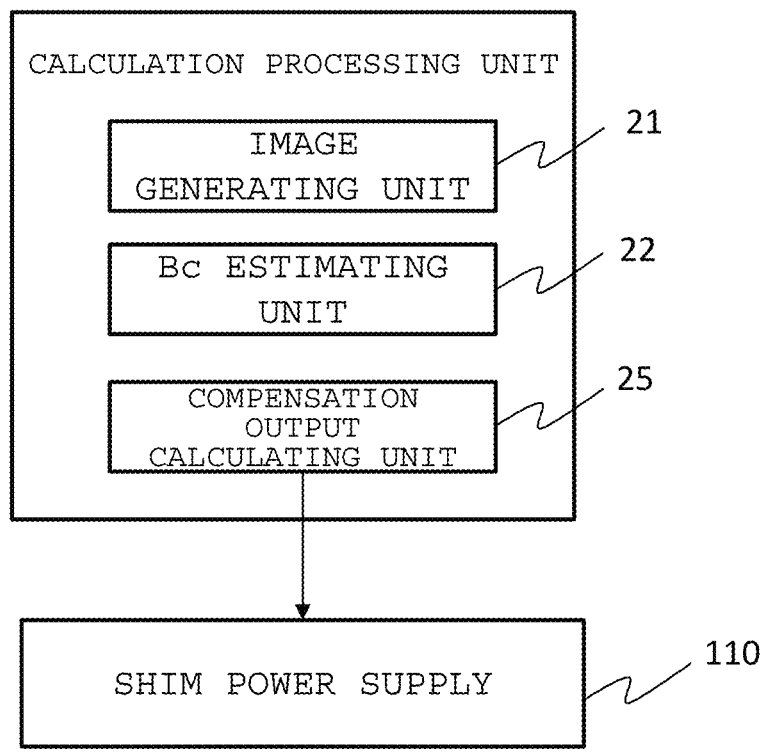
FIG. 15 is a functional block diagram of a calculation processing unit according to a third embodiment.

The functions of the calculation processing unit 200 according to the present embodiment are shown in FIG. 15. In FIG. 15, the same elements as those in FIGS. 2 and 12 are indicated by the same reference numerals, and redundant descriptions will be omitted. As shown in FIG. 15, the calculation processing unit 200 includes a compensation output calculating unit 25 in addition to the image generating unit 21 and the Bc estimating unit 22. The compensation output calculating unit 25 calculates an output value of a constant compensation current flowing through the shim coil 109 from the static magnetic field inhomogeneity estimated by the Bc estimating unit 22. The measurement control unit 111 (FIG. 1) executes a control to supply the compensation current corresponding to the calculated output value to the shim power supply 110.

Figure 16:
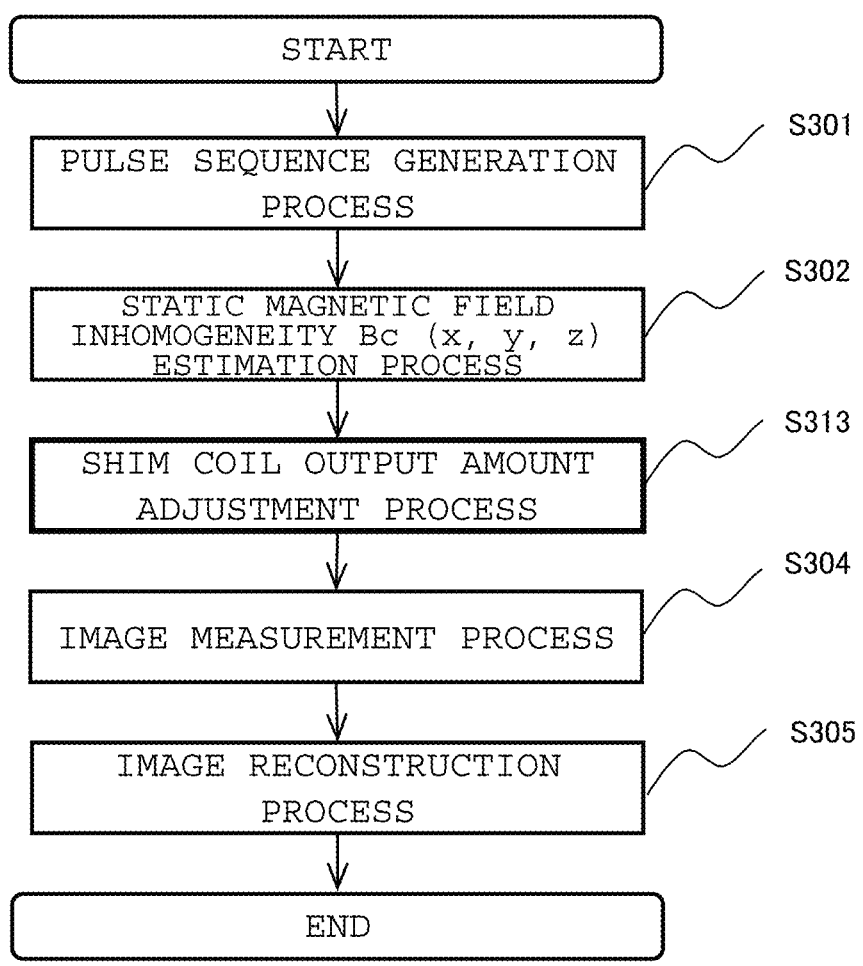
FIG. 16 is a flow diagram showing a process of estimating a static magnetic field inhomogeneity and correcting the static magnetic field inhomogeneity according to the third embodiment.

FIG. 16 shows a flow of processes according to the present embodiment. In FIG. 16, the same processes as those in FIG. 3 are indicated by the same reference numerals, and redundant descriptions will be omitted. Here, as a premise, it is assumed that a normal active shimming is applied to achieve the static magnetic field homogeneity. The active shimming is a method of improving the static magnetic field homogeneity by measuring the homogeneity of the static magnetic field in advance and energizing the shim coil 109 with a compensation current. However, it is not essential to use the active shimming in combination.

As shown in the flowchart in FIG. 16, in the process S301 and the process S302, similarly to processes in the first and second embodiments, the static magnetic field inhomogeneity Bc is estimated based on the shape of the pulse sequence.

Next, in S313, the compensation output calculating unit 25 calculates the output amount of the compensation current that generates the compensation magnetic field canceling the static magnetic field inhomogeneity Bc. The compensation magnetic field canceling the static magnetic field inhomogeneity Bc is, for example, a gradient magnetic field that has a distribution in the form of a quadratic function in which positive and negative directions are opposite to those of the distribution in the form of a quadratic function shown in FIG. 7, and the output amount can be calculated based on relation between the magnetic field generated by the shim coil and the output. The output (the Bc compensation current) calculated in this way is added to the compensation current calculated by the active shimming.

Accordingly, since the static magnetic field inhomogeneity Bc caused by the application of the gradient magnetic field has been corrected when the echo signal is acquired, an image without distortion can be obtained.

According to the present embodiment, since the static magnetic field homogeneity is corrected including the static magnetic field inhomogeneity Bc caused by the application of the gradient magnetic field during the imaging, which cannot be solved by a normal active shimming that is premised on the preliminary measurement, a high image deterioration prevention effect can be achieved in the imaging for which the static magnetic field inhomogeneity caused by the application of the gradient magnetic field cannot be ignored. Since an output that eliminates the static magnetic field inhomogeneity is added as a compensation current that is a fixed value, it is not necessary to switch the shim coil, a high degree of responsiveness to the shim coil is not required, and problem of eddy current generation (error magnetic field generation) due to the switching is eliminated.

In the MRI apparatus according to the present embodiment, since the Bc compensation current is added in addition to an original compensation current, the static magnetic field homogeneity may conversely deteriorate at a timing when the frequency encode gradient magnetic field or the phase encode gradient magnetic field is not applied, such as when a slice selection gradient magnetic field is applied. However, such a problem may be avoided by changing the amount of the compensation current during the execution of the pulse sequence if the compensation current can be changed at a timing when a response of the shim coil is in time. For example, the Bc compensation current is not applied when a frequency selection excitation is used for fat suppression, and the application may be started after a fat suppression pulse is applied.

FOURTH EMBODIMENT

In the third embodiment, the compensation current that additionally energizes the shim coil is determined based on the static magnetic field inhomogeneity Bc estimated based on the pulse sequence shape. In the present embodiment, Equation (5) is used instead of Equation (2) as an equation for estimating the static magnetic field inhomogeneity Bc as in the second embodiment, and accuracy of the image quality improvement is improved by calculating the adjustment value (the correction coefficients and the position correction values) with a phantom in advance.

Figure 17:
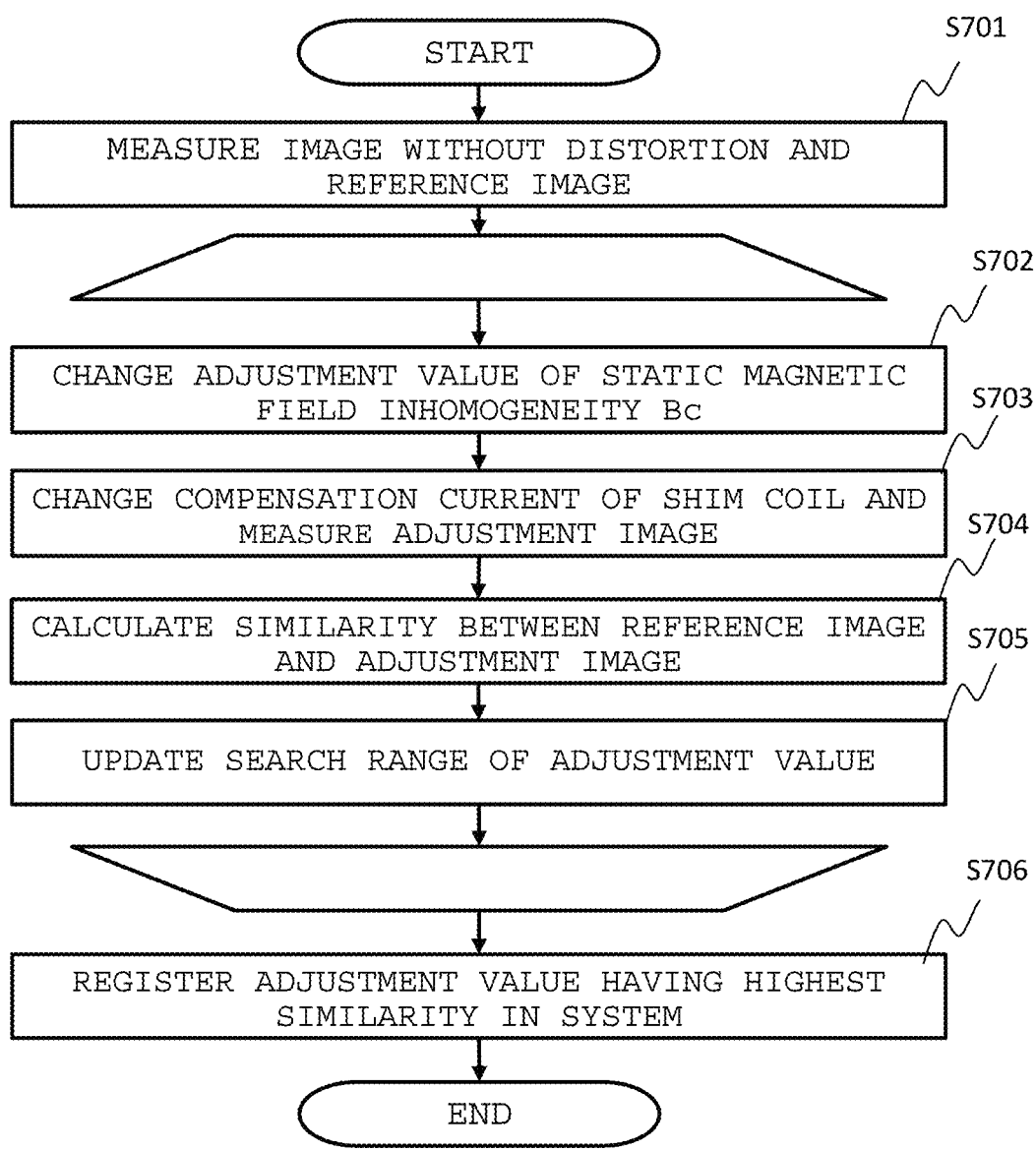
FIG. 17 is a diagram showing a flow for calculating an adjustment value of an output amount of a shim coil according to a fourth embodiment.

The image processing unit 200 according to the present embodiment has the same configuration as that in FIG. 15 except that the adjustment value calculating unit is added to the image processing unit 200 according to the second embodiment shown in FIG. 15, and the illustration is omitted. In the present embodiment, an outline of the flow of processes is the same as that in FIG. 16, and thus hereinafter, an example of calculating the adjustment value will be described with reference to a flowchart shown in FIG. 17. In the following description, the flowcharts (FIGS. 13 and 15) used in the descriptions of the second and third embodiments will be referred to as appropriate.

Figure 13:
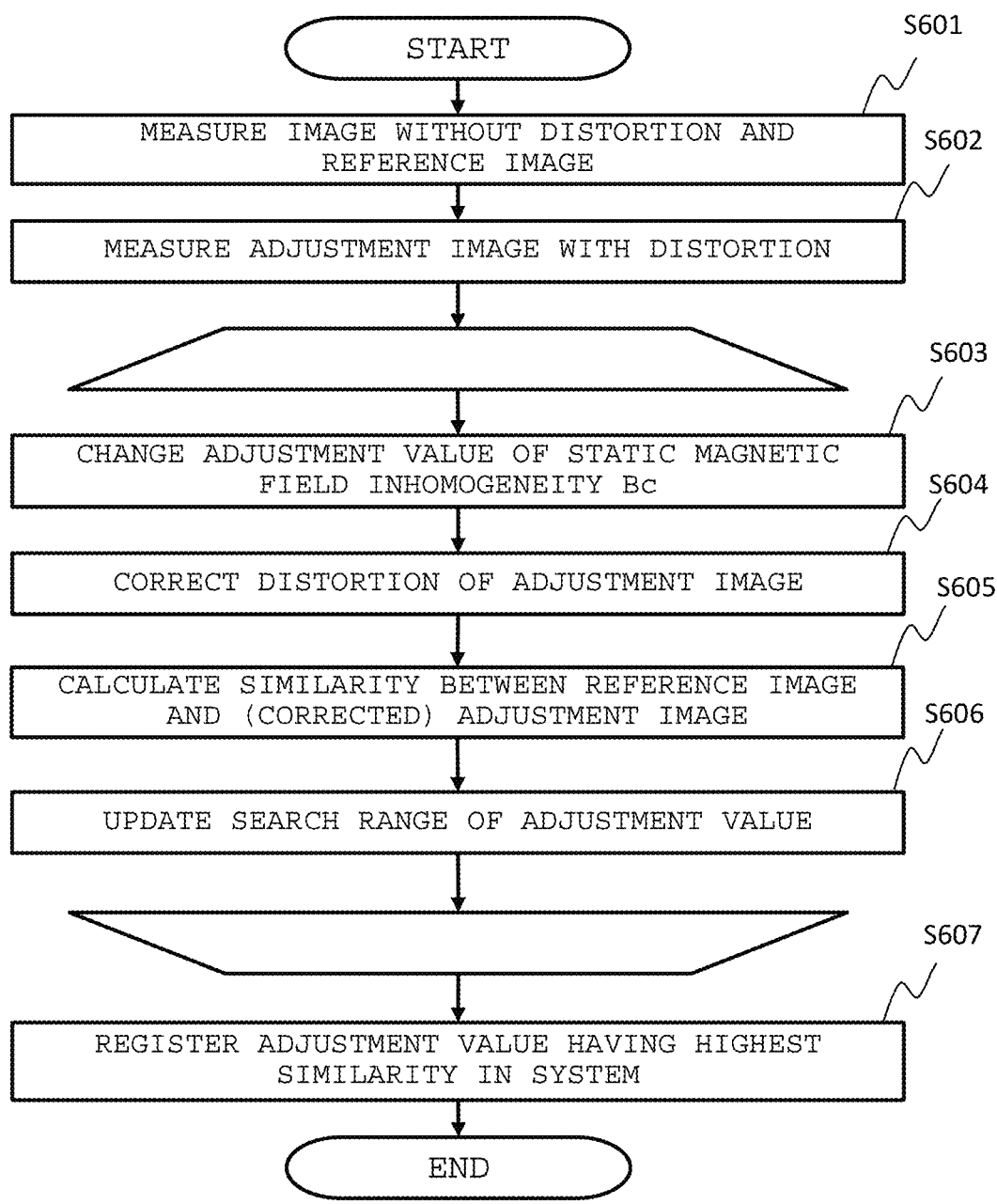
FIG. 13 is a flow diagram showing a process of estimating an adjustment value of a static magnetic field inhomogeneity according to the second embodiment.

First, in S701, similarly to S601 in FIG. 13, the reference image without distortion is measured using a phantom. Next, the repeated calculation (S702 to S705) for searching for an appropriate adjustment value is executed. Therefore, first, the initial value of the adjustment value is set (S702), and the static magnetic field inhomogeneity Bc caused by the gradient magnetic field pulse is calculated using this adjustment value and Equation (5). The strengths of the gradient magnetic fields Gx, Gy, and Gz used in Equation (5) can use, for example, the strengths of the gradient magnetic fields in the imaging sequence to be used in the following S703.

The output value of the shim coil that corrects the calculated static magnetic field inhomogeneity Bc is calculated, the compensation current of the shim coil is changed, and the adjustment image is measured using the same phantom as the reference image (S703). The similarity between the acquired adjustment image and the reference image acquired in S701 is calculated (S704). The method for calculating the similarity is the same as that in S605 according to the second embodiment. If the similarity is high, the adjustment value set in S702 is appropriate, and the range for searching for the adjustment value is changed (S705) and S702 to S704 are repeated until a high similarity is acquired. The method for determining the adjustment value and the method for setting the search range are the same as those according to the second embodiment, a method of searching for the adjustment value from a wide range while narrowing the range can be appropriately adopted.

Finally, the adjustment value showing the highest similarity is registered (S706). These processes can be executed in advance independently of the actual imaging. When an image of the subject is measured, the processes (S301 to S305) are executed as described in the flow in FIG. 16.

In the present embodiment as well, the adjustment value may be different depending on the spatial position (the slice position) as in the second embodiment. In the imaging for acquiring the reference image and the image using the adjustment value, a compensation output may be calculated with a different strength of the gradient magnetic field by changing the conditions such as the reception bandwidth BW, and the adjustment value may be a function according to the strength of the gradient magnetic field.

According to the present embodiment, the accuracy of the compensation output can be further improved, and an image in which the image distortion caused by the gradient magnetic field is eliminated can be acquired.

Although some embodiments of the MRI apparatus according to the invention and the modifications of the embodiments are described above, the invention is not limited to these embodiments and modifications. It is possible to combine these embodiments and modifications as long as these embodiments and modifications are not technically inconsistent, and it is also possible to add a well-known correction unit or the like. Further, some elements may also be omitted from configurations shown as the embodiments or the modifications.

What is claimed is:

1. A magnetic resonance imaging apparatus comprising:
a transmitting unit configured to irradiate a subject placed in a static magnetic field space with high frequency pulses;
a receiving unit configured to receive an echo signal generated from the subject by irradiation with the high frequency pulses;
a gradient magnetic field generating unit configured to generate a gradient magnetic field in the static magnetic field space;
a control unit configured to control the transmitting unit, the gradient magnetic field generating unit, and the receiving unit according to a predetermined pulse sequence, for collecting echo data;
an image generating unit configured to reconstruct an image of the subject based on the echo data;
a static magnetic field inhomogeneity estimating unit configured to estimate, by calculating in advance of an imaging process based on the predetermined pulse sequence and without preliminary measurement, a static magnetic field inhomogeneity to be caused by application of the gradient magnetic field based on the predetermined pulse sequence, the static magnetic field inhomogeneity estimating unit calculating in advance of the imaging process the static magnetic field inhomogeneity using an application strength or an average application strength of a gradient magnetic field pulse determined by the predetermined pulse sequence; and
a compensation magnetic field generating unit configured to output a constant compensation magnetic field, in advance of the imaging process and without preliminary measurement, to compensate for the static magnetic field inhomogeneity.

2. The magnetic resonance imaging apparatus according to claim 1, wherein the static magnetic field inhomogeneity estimating unit estimates the static magnetic field inhomogeneity according to a spatial position.

3. The magnetic resonance imaging apparatus according to claim 1, further comprising:
a storage unit configured to register in advance an adjustment value for adjusting the static magnetic field inhomogeneity estimated by the static magnetic field inhomogeneity estimating unit, wherein
the static magnetic field inhomogeneity estimating unit adjusts the estimated static magnetic field inhomogeneity based on the adjustment value registered in the storage unit.

4. The magnetic resonance imaging apparatus according to claim 3, wherein
the adjustment value includes a correction coefficient for adjusting a strength of the static magnetic field inhomogeneity and a position correction value for adjusting a center position of the static magnetic field.

5. The magnetic resonance imaging apparatus according to claim 4, further comprising:
an adjustment value calculating unit configured to calculate the adjustment value by a repeated calculation, the repeated calculation maximizing a similarity between an image acquired by correcting a pre-measured image including an influence due to the static magnetic field inhomogeneity using the static magnetic field inhomogeneity estimated by the static magnetic field inhomogeneity estimating unit, and a reference image not including the influence due to the static magnetic field inhomogeneity.

6. The magnetic resonance imaging apparatus according to claim 1, further comprising:
a distortion calculating unit configured to calculate a distortion generated in an image based on the static magnetic field inhomogeneity estimated by the static magnetic field inhomogeneity estimating unit, wherein
the image generating unit corrects a reconstructed image based on the distortion calculated by the distortion calculating unit.

7. The magnetic resonance imaging apparatus according to claim 1, further comprising:
a compensation output calculating unit configured to calculate, based on the static magnetic field inhomogeneity estimated by the static magnetic field inhomogeneity estimating unit, an output value corresponding to the constant compensation magnetic field for correcting for the static magnetic field inhomogeneity, in advance of the imaging process based on the pulse sequence, wherein
the control unit executes control, based on the output value output by the compensation output calculating unit in advance of the imaging process, to apply the constant compensation magnetic field.

8. An image correction method for correcting for a static magnetic field inhomogeneity in a magnetic resonance imaging apparatus including a transmitting unit configured to irradiate a subject placed in a static magnetic field space, and a receiving unit configured to receive an echo signal generated from the subject by irradiation from the transmitting unit, the image correction method comprising:
- a step (a) of estimating, by calculating in advance of an imaging process based on a pulse sequence to be used for imaging and without preliminary measurement, and by using an application strength or an average application strength of a gradient magnetic field pulse according to the pulse sequence to be used for imaging, a static magnetic field inhomogeneity based on the pulse sequence; and
- a step (b) of executing control to apply, in advance of the imaging process based on the pulse sequence, a constant compensation magnetic field compensating for the static magnetic field inhomogeneity which is estimated in step (a) in advance of the imaging process and without preliminary measurement.

9. The image correction method according to claim 8, further comprising:
- a step of calculating an error that occurs in the estimation of the static magnetic field inhomogeneity by preliminary imaging, and registering the error as an adjustment value; and
- a step of improving estimation accuracy of the static magnetic field inhomogeneity using the adjustment value in the step of estimating the static magnetic field inhomogeneity.

10. The image correction method according to claim 8, further comprising:
- a step of calculating an amount of distortion generated in a reconstructed image, which is measured by the magnetic resonance imaging apparatus, based on the estimated static magnetic field inhomogeneity; and
- a step of correcting the reconstructed image with the calculated amount of distortion.

11. The image correction method according to claim 8, further comprising:
- a step (a1) of calculating, based on the static magnetic field inhomogeneity estimated in (a), an output value corresponding to the constant compensation magnetic field to be applied, for correcting the static magnetic field inhomogeneity in advance of the imaging process based on the pulse sequence to be used for imaging, wherein
- the control executed in step (b) to apply the constant compensation magnetic field for correcting the static magnetic field inhomogeneity is based on the output value calculated in (a1) in advance of the imaging process.

12. A static magnetic field inhomogeneity correction method for correcting for a static magnetic field inhomogeneity in a magnetic resonance imaging apparatus that includes a transmitting unit configured to irradiate a subject placed in a static magnetic field space, and a receiving unit configured to receive an echo signal generated from the subject by irradiation from the transmitting unit, the static magnetic field inhomogeneity correction method comprising:
- a step (a) of estimating, by calculating in advance of an image measurement process based on a pulse sequence to be used for imaging and without preliminary measurement, and by using an application strength or an average application strength of a gradient magnetic field pulse determined by the pulse sequence to be used for imaging, the static magnetic field inhomogeneity based on the pulse sequence; and
- a step (b) of executing control to apply, in advance of the image measurement process based on the pulse sequence, a constant compensation magnetic field compensating for the static magnetic field inhomogeneity which is estimated in step (a) in advance of the image measurement process and without preliminary measurement.

13. The static magnetic field inhomogeneity correction method according to claim 12, further comprising:
- a step (a1) of calculating, based on the static magnetic field inhomogeneity estimated in (a), an output value corresponding to the constant compensation magnetic field to be applied for correcting the static magnetic field inhomogeneity in advance of the image measurement process based on the pulse sequence to be used for imaging, wherein
- the control executed in step (b) to apply the constant compensation magnetic field for correcting the static magnetic field inhomogeneity is based on the output value calculated in (a1) in advance of the image measurement process.

* * * * *